US007587487B1

(12) United States Patent
Gunturu (10) Patent No.: US 7,587,487 B1
(45) Date of Patent: Sep. 8, 2009

(54) METHOD AND APPARATUS FOR LOAD BALANCING BASED ON XML CONTENT IN A PACKET

(75) Inventor: Anilkumar Gunturu, Santa Clara, CA (US)

(73) Assignee: Foundry Networks, Inc., Santa Clara, CA (US)

( * ) Notice: Subject to any disclaimer, the term of this patent is extended or adjusted under 35 U.S.C. 154(b) by 705 days.

(21) Appl. No.: 10/731,979

(22) Filed: Dec. 10, 2003

(51) Int. Cl.
G06F 15/16 (2006.01)
G06F 17/00 (2006.01)

(52) U.S. Cl. .................... 709/224; 709/227; 709/206; 707/104.1

(58) Field of Classification Search .............. 709/203, 709/206, 224, 228, 225, 229; 707/10; 705/14, 705/21; 700/100
See application file for complete search history.

(56) References Cited

U.S. PATENT DOCUMENTS

| | | | |
|---|---|---|---|
| 5,941,947 A | 8/1999 | Brown et al. | |
| 6,381,602 B1 | 4/2002 | Shoroff et al. | |
| 6,651,096 B1 | 11/2003 | Gai et al. | |
| 6,732,175 B1 | 5/2004 | Abjanic | |
| 7,096,270 B2 | 8/2006 | Abjanic et al. | |
| 7,219,125 B1 | 5/2007 | Day | |
| 7,296,263 B1 | 11/2007 | Jacob | |
| 7,366,781 B2 | 4/2008 | Abjanic | |
| 7,370,100 B1 | 5/2008 | Gunturu | |
| 2002/0143614 A1* | 10/2002 | MacLean et al. | ........... 705/14 |
| 2004/0019633 A1* | 1/2004 | Scott et al. | ............... 709/203 |
| 2004/0024861 A1* | 2/2004 | Coughlin | ............... 709/224 |
| 2004/0054569 A1* | 3/2004 | Pombo et al. | ............... 705/7 |
| 2004/0078105 A1* | 4/2004 | Moon et al. | ............... 700/100 |
| 2004/0088349 A1* | 5/2004 | Beck et al. | ............... 709/203 |
| 2005/0049924 A1* | 3/2005 | DeBettencourt et al. | ...... 705/21 |
| 2005/0060372 A1* | 3/2005 | DeBettencourt et al. | .... 709/206 |
| 2005/0108428 A1 | 5/2005 | Cornet et al. | |
| 2005/0138038 A1 | 6/2005 | Betts et al. | |
| 2005/0152286 A1 | 7/2005 | Betts et al. | |
| 2005/0273772 A1 | 12/2005 | Matsakis et al. | |
| 2006/0165015 A1 | 7/2006 | Melick et al. | |
| 2006/0227811 A1 | 10/2006 | Hussain et al. | |
| 2006/0259562 A1 | 11/2006 | Stark et al. | |
| 2007/0118339 A1 | 5/2007 | Moon | |
| 2007/0124725 A1 | 5/2007 | Wang et al. | |
| 2007/0192422 A1 | 8/2007 | Stark et al. | |
| 2008/0059651 A1 | 3/2008 | Ashwood Smith | |

OTHER PUBLICATIONS

Gunturu, "Method and Apparatus for Load Balancing Based on Packet Header Content," U.S. Appl. No. 10/731,972, filed Dec. 10, 2003.

Gunturu, Anilkumar, "Method and Apparatus for Load Balancing Based on Packet Header Content," filed Feb. 28, 2008 and assigned U.S. Appl. No. 12/039,504.

* cited by examiner

*Primary Examiner*—Khanh Q Dinh
(74) *Attorney, Agent, or Firm*—James E. Parsons; Brandon Hsieh (57) ABSTRACT

A technique to load balance network packet traffic using content switching is provided. Packets are routed to a particular server or otherwise processed based on the XML-related content identified in a header or body of the packet. Rules can be defined that specify an action to undertake with regards to the packet if certain pieces of XML-related content are identified therein. These actions can include forwarding of the packet to a particular server or servers that best process the transaction associated with the packet.

6 Claims, 8 Drawing Sheets

METHOD AND APPARATUS FOR LOAD BALANCING BASED ON XML CONTENT IN A PACKET

TECHNICAL FIELD

This disclosure relates generally to communication of packets within a network. More particularly but not exclusively, the present disclosure relates to techniques for making load balancing decisions based on extensible markup language (XML) content in a packet.

BACKGROUND INFORMATION

The most basic unit of data transmission in Transmission Control Protocol/Internet Protocol (TCP/IP) or Internet networking is a packet (sometimes referred to as a "datagram"). A packet is a small piece of information coded at a source, marked with the source address (SA), and directed to a destination address (DA). The SA and DA are typically placed in a header of the packet, while data is placed in a payload of the packet. Traditional IP networks and systems rely exclusively on IP addressing to route the packet from one IP network to another, until arriving at the destination address specified in the packet. Routers, switches (such as Ethernet switches), hubs, or other network devices operate to forward packets to their ultimate destination.

A packet can have several headers. For instance, a packet can have a Layer 2 header and a Layer 2 payload. The Layer 2 payload in turn can include a Layer 3 header and a Layer 3 payload. The Layer 3 payload can in turn include a Layer 4 header and a Layer 4 payload, and so on. The Layer 4 payload includes an HTTP header and the HTTP payload. Within the HTTP header, there are several fields whose contents are defined by Request for Comments (RFC) standards. Examples include HTTP header fields having information present in hostname, uniform resource locator (URL), and cookie fields.

For purposes of load balancing network traffic, packets are routed among different servers to ensure that one server does not service all incoming client requests. One technique to load balance is based on the content present in the RFC-defined hostname, URL, and cookie fields of an HTTP header. For example, a packet can be routed to a particular server on the basis of a hostname or host identification (ID) specified in the destination hostname field. As another example, a packet can be directed to a particular server based on a prefix, suffix, or pattern in a URL string of a GET request. As yet another example, cookie switching allows load balancing based on a cookie value, where the cookie value is present as a name value pair in the HTTP header. Accordingly, since the content of these HTTP fields is used for load balancing decisions, this type of routing of packets can be viewed as involving "content switching."

While use of the information in these three fields does provide load balancing capability, such use is rather primitive and limited in functionality. For instance, the syntax of these rules can be likened to a simple "if-then" statement (e.g., "if the hostname=X, then route the packet to server 1"). The simple structure and primitive evaluation process of these rules is inadequate for use in more complex load balancing scenarios. Moreover, load balancing decisions that are based solely on the information in these three HTTP header fields do not achieve a sufficient or desirable level of network traffic distribution in many environments.

BRIEF SUMMARY OF THE INVENTION

One aspect of the present invention provides a method that includes examining a packet to determine if the packet contains extensible markup language (XML)-related content. If any XML-related content is determined to be present, the method matches that XML-related content to a rule, and determines an action to undertake with regards to the packet based on the matching rule.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various views unless otherwise specified.

DETAILED DESCRIPTION

Embodiments of techniques to load balance based on packet content, such as XML content, by using and evaluating logical rules are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment provides a technique to load balance using content switching that is based on XML content in a packet. That is, packets can be routed to a particular server or otherwise processed based on the XML content contained in the packets. Thus, rather than making load balancing decisions based solely on the hostname, URL, or cookie fields in the HTTP header, an embodiment can support more intelligent and specific content switching decisions based on any XML information contained in the HTTP body of a packet and which are identified by XML tags or other indicia.

According to one embodiment, a plurality of content switching policies is provided. A policy comprises a set of rules and actions associated with these rules. Each rule in turn can comprise a simple rule, a rule based on a method type, a nested rule including multiple simple rules, and other rules based on content, including XML content, of fields in an HTTP header or in other portions of a packet. Various embodiments provide commands for searching a packet for XML-related information and for structuring rules to define actions to undertake with a packet having identified XML-related information present therein.

Figure 1:
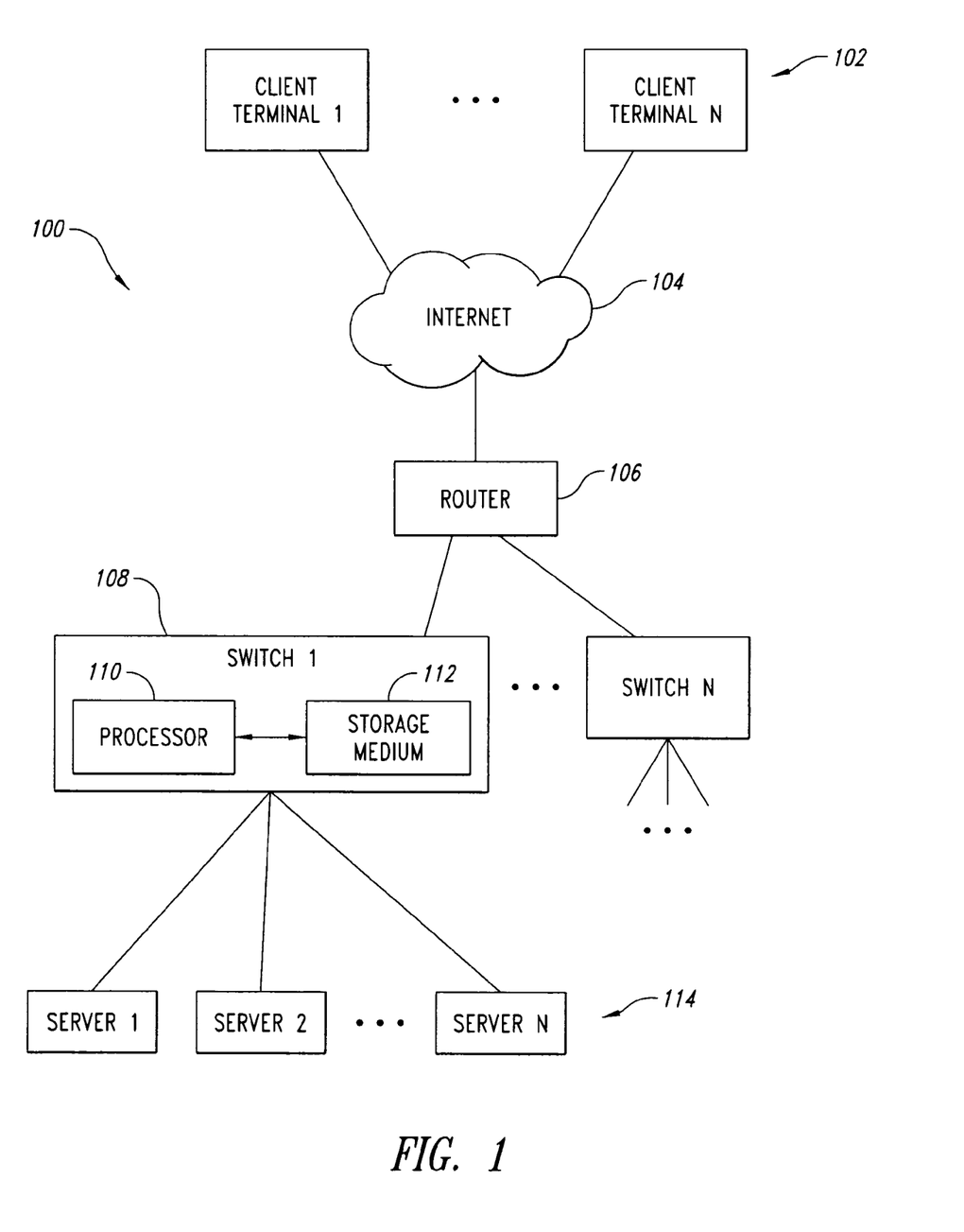
FIG. 1 is a block diagram of an example system in which one embodiment may be implemented.

FIG. 1 is a block diagram of an example system 100 in which one embodiment may be implemented. For the sake of simplicity and brevity, not all of the possible components that may be present in the system 100 are shown in FIG. 1 or described in detail herein. Only certain components that are helpful in understanding operation of an embodiment are shown and described.

The system 100 includes a plurality of client terminals 102 that are communicatively coupled to a network 104. The network 104 is illustrated in FIG. 1 as an Internet, and it is appreciated that other embodiments can be implemented in conjunction with other types of networks, such as local area networks (LANs), virtual private networks (VPNs), and the like.

One or more routers 106 are coupled to the network 104. Each router is in turn coupled to one or more switches 108. An example of a switch 108 with which an embodiment may be implemented is the ServerIron® product available from Foundry Networks, Inc. of San Jose, Calif. The switch 108 includes one or more processors 110, and one or machine-readable storage media 112. In an embodiment, the storage medium 112 can store software, code, or other machine-readable instructions executable by the processor 110, wherein such machine-readable instructions are used in connection with performing load balancing decisions based on packet header content. In one embodiment, the storage medium 112 stores code that defines rules and load balancing actions to be undertaken based on the rules, including code that executes an algorithm to evaluate the rules and to perform actions based on results of the evaluation of the rules. Additionally, the storage medium 112 can store data (such as in databases, look-up tables, files, or other data structure) that is used in connection with performing the load balancing algorithms and decisions.

Each of the switches 108 is coupled to a plurality of servers 114. The servers 114 can form part of a server cluster, or can be identified by group identifications (IDs), in some implementations. The servers 114 can provide access to applications, web sites, files and data, or other resources requested by the client terminals 102. A URL, destination address, port number, IP address, hostname, domain name, or other suitable identification mechanism can identify these resources and/or the servers 114. Based on load balancing decisions and other criteria, the switch 108 can decide which particular server 114 to route a request sent from a client terminal 102.

In one embodiment, the communication between the various components in the system 100 can be performed using packet-based or packet-switching communication techniques. Example protocols are TCP/IP and HTTP, and it is appreciated that some embodiments may be implemented in systems 100 that can use other types of protocols (or combinations thereof).

One embodiment is applicable to the communication of XML documents (or other XML-formatted contents) that is encapsulated by Simple Object Access Protocol (SOAP), wherein SOAP uses HTTP as the transport protocol for carrying SOAP messages. To briefly summarize, XML is a document format that has stricter syntax rules than HTTP and yet is a powerful meta-language that facilitates highly structured and specialized documents. The syntax of XML is similar to that of HTTP, but differs in its ability to define arbitrary user-defined tags or attributes that highlight key information within the XML document. XML documents have tags and attributes (strings of alphanumeric text) that reveal significant details about the document content. Tags and attributes in an XML document are like keywords, and reveal information about the application information exchanges.

The following is an example of an XML document and illustrates some sample tags and/or attributes:

Example 1

```
<?xml version="1.0"?>
<!--Comments -->
<root_node>
        <node1 attr1="value1" attrN="valueN">
                <node2>
                </node2>
        </node1>
        <node1>
                        Sample Text
        </node1>
</root_node>
```

An XML document has a declaration (e.g., conforms to XML 1.0 specification). An XML document also has nested elements starting with the root element "root_node," while the rest of the elements "node1," "node2," etc. are all child elements. Application messages formed using XML may contain tags and attributes that indicate application type, client class, message type and other information, which in one embodiment can be used to efficiently switch and service application traffic. XML's ease of use and highly structured format has made XML format popular for web transactions.

Figure 2:
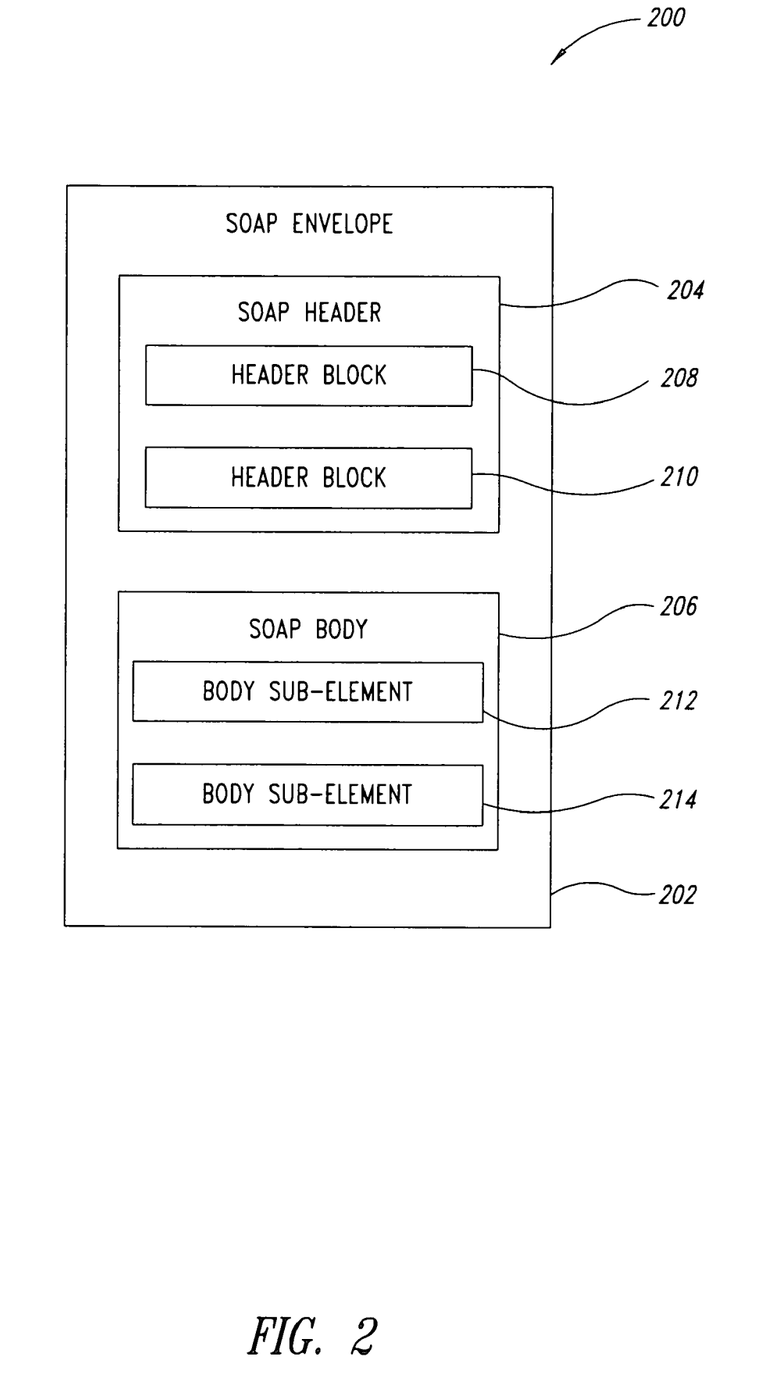
FIG. 2 is a diagrammatic illustration of a SOAP message that be used to carry XML content.

SOAP messages can be exchanged as a payload of an HTTP POST request and response, or as a message in the response to an HTTP GET, for example. A pictorial representation of a SOAP message 200 is shown in FIG. 2. The SOAP message 200 is encapsulated in an envelope 202 that contains two SOAP specific sub-elements: header 204 and body 206. The header 204 is optional and provides a way to pass control information that is not present in the body 206. The header 204 and body 206 can in turn include sub-elements 208-214. XML content encapsulated by the SOAP envelope 202 may be present in either or both the header 204 and the body 206.

Figure 3:
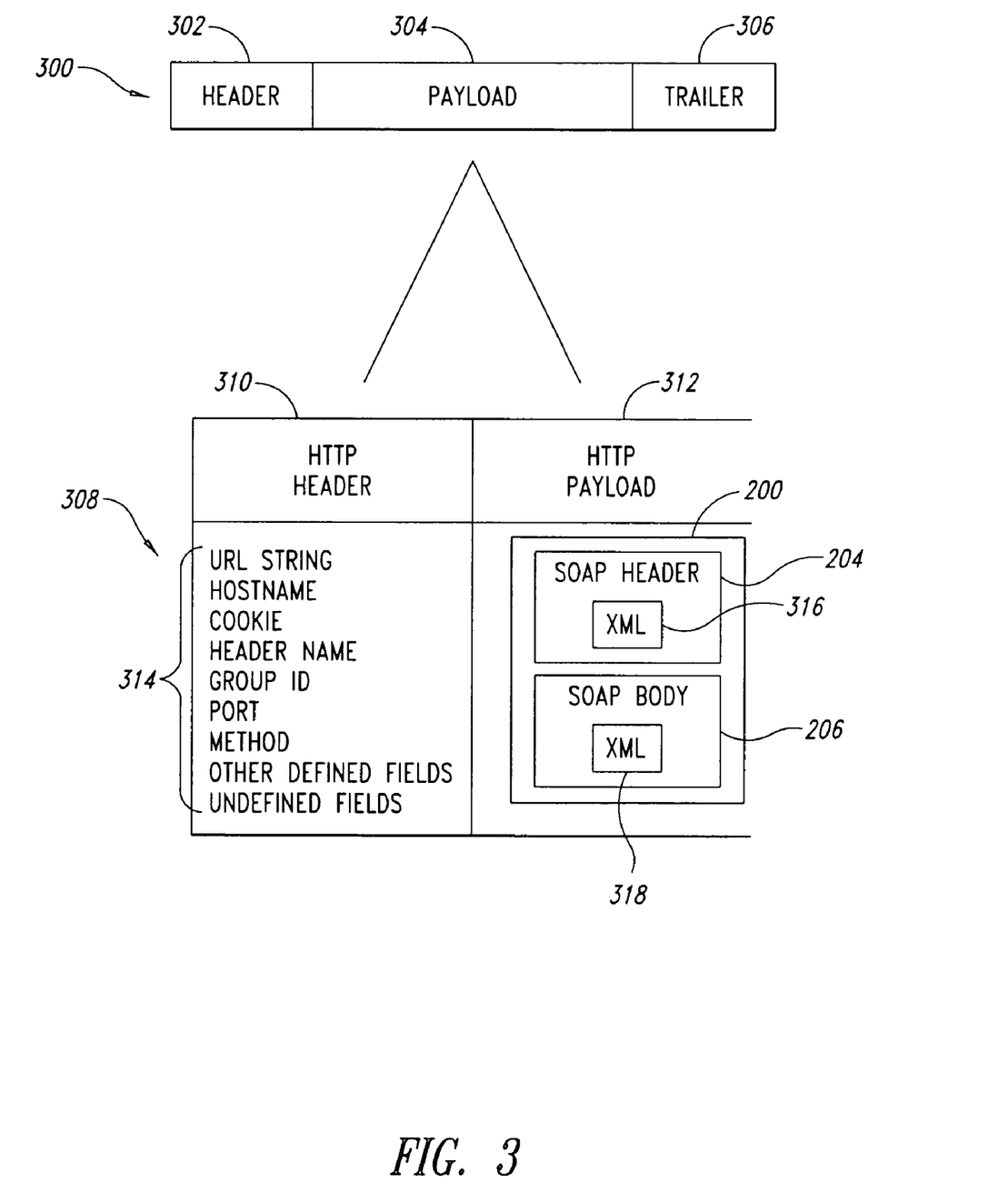
FIG. 3 is a diagrammatic illustration of a packet having XML content and other content that can be evaluated by one embodiment.

FIG. 3 is a diagrammatic illustration of a packet, such as a TCP packet, having XML content and other content that can be evaluated by one embodiment when making content-based load balancing decisions. The packet 300 includes a header 302, a payload 304, and a trailer 306. The payload 304 can in turn include additional layers headers and payloads. For instance, a Layer 2 payload can contain the Layer 3 header and payload, the Layer 3 payload can contain the Layer 4 header and payload, and so on.

One of these embedded layers corresponds to an application layer that contains an HTTP packet 308 having an HTTP header 310 and an HTTP payload 312. The HTTP header 310 includes a plurality of fields 314 containing certain pieces of information. For example, some of the fields 314 include a field having a URL string (of a destination for the packet 308), a field having a hostname associated with the destination, and a cookie field. There may be other fields that contain information associated with a server group ID, a destination port, method, control information, and the like. Other fields (and their contents) in the HTTP header 310 may be defined or undefined. The defined fields can be fields whose contents are defined by standards or protocols. The undefined fields have no specific requirement as to their contents or formats, and are generally available for insertion of any type of information deemed useful by users.

The SOAP message 200 can be carried in the HTTP payload 312 in one example implementation, as symbolically shown in FIG. 3. The header 204 and body 206 of the SOAP message 200 can respectively embed or otherwise include XML-formatted content 316 and 318. The HTTP protocol implicitly correlates its requests with responses, and hence SOAP request and response messages can be correlated when HTTP is the transport for SOAP messages.

SOAP-HTTP bindings use HTTP GET and POST web methods, resulting in two message exchange patterns:

a) The use of the HTTP GET method in a HTTP request to return a SOAP message in the body of a HTTP response. This is a SOAP response message exchange pattern.

b) The use of the HTTP POST method for conveying SOAP messages in the bodies of HTTP request and response messages. This is a SOAP request-response message exchange pattern.

In the scenario of (a), the response to an HTTP GET request from a requesting SOAP node is a SOAP message in the HTTP response. The example below shows an HTTP GET request for a travel reservation:

---

Example 2

```
GET /travelcompany.example.org/reservations?code=FT35ZBQ HTTP/1.1
Host: travelcompany.example.org
Accept: application/soap+xml
```

---

The HTTP Accept header is used to indicate a preferred representation of the resource being requested. For SOAP messages of this example, the representation of the requested resource is application/soap+xml. The response to the HTTP GET request would thus be a SOAP response message having XML-formatted content (e.g., indicated with tags and attributes) carried therein. An example response is shown below:

---

Example 3

```
HTTP/1.1 200 OK
Content-Type: application/soap+xml; charset="utf-8"
Content-Length: nnnn
<?xml version='1.0' ?>
<env:Envelope xmlns:env="http://www.w3.org/2003/05/soap-envelope">
  <env:Header>
    <m:reservation xmlns:m="http://travelcompany.example.org/reservation"
        env:role="http://www.w3.org/2003/05/soap-envelope/role/next"
        env:mustUnderstand="true">
      <m:reference>uuid:093a2da1-q345-739r-ba5d-pqff98fe8j7d</m:reference>
        <m:dateAndTime>2001-11-30T16:25:00.000-05:00</m:dateAndTime>
    </m:reservation>
  </env:Header>
  <env:Body>
    <rdf:RDF xmlns:rdf="http://www.w3.org/1999/02/22-rdf-syntax-ns#"
        xmlns:x="http://travelcompany.example.org/vocab#"
        env:encodingStyle="http://www.w3.org/1999/02/22-rdf-syntax-ns#">
      <x:ReservationRequest
        rdf:about="http://travelcompany.example.org/reservations?code=FT35ZBQ">
```

---

Example 3
-continued

```
        <x:passenger>Åke Jógvan Øyvind</x:passenger>
        <x:outbound>
          <x:TravelRequest>
            <x:to>LAX</x:to>
            <x:from>LGA</x:from>
            <x:date>2001-12-14</x:date>
          </x:TravelRequest>
        </x:outbound>
        <x:return>
          <x:TravelRequest>
            <x:to>JFK</x:to>
            <x:from>LAX</x:from>
            <x:date>2001-12-20</x:date>
          </x:TravelRequest>
        </x:return>
      </x:ReservationRequest>
    </rdf:RDF>
  </env:Body>
</env:Envelope>
```

---

The examples below illustrate the format for HTTP POST request and response messages of scenario (b) with SOAP-HTTP binding:

---

Example 4

```
POST /Reservations?code=FT35ZBQ HTTP/1.1
Host: travelcompany.example.org
Content-Type: application/soap+xml; charset="utf-8"
Content-Length: nnnn
<?xml version='1.0' ?>
<env:Envelope xmlns:env="http://www.w3.org/2003/05/soap-envelope">
  <env:Header>
    <t:transaction
        xmlns:t="http://thirdparty.example.org/transaction"
        env:encodingStyle="http://example.com/encoding"
        env:mustUnderstand="true" >5</t:transaction>
  </env:Header>
  <env:Body>
    <m:chargeReservation
        env:encodingStyle="http://www.w3.org/2003/05/soap-encoding"
        xmlns:m="http://travelcompany.example.org/">
      <m:reservation xmlns:m="http://travelcompany.example.org/reservation">
        <m:code>FT35ZBQ</m:code>
      </m:reservation>
      <o:creditCard xmlns:o="http://mycompany.example.com/financial">
        <n:name xmlns:n="http://mycompany.example.com/employees">
          Åke Jógvan Øyvind
        </n:name>
        <o:number>123456789099999</o:number>
        <o:expiration>2005-02</o:expiration>
      </o:creditCard>
    </m:chargeReservation>
  </env:Body>
</env:Envelope>
```

| Example 5 |
|---|
| HTTP/1.1 200 OK |
| Content-Type: application/soap+xml; charset="utf-8" |
| Content-Length: nnnn |
| <?xml version='1.0' ?> |
| <env:Envelope xmlns:env="http://www.w3.org/2003/05/soap-envelope"> |
| <env:Header> |
| . . . |
| . . . |
| </env:Header> |
| <env:Body> |
| . . . |
| . . . |
| </env:Body> |
| </env:Envelope> |

In an embodiment, content switching for load balancing purposes can be based at least in part on XML content contained in a packet being communicated within the system 100 of FIG. 1. As an example, since XML messages are highly structured and carried as SOAP-encapsulated messages in HTTP GET and POST messages, such XML messages can be examined and then sophisticated rules can be applied for making load balancing decisions as to which action to take with regards to the packet.

Content switching load balancing decisions may be performed in one embodiment for a GET request having an HTTP Accept header, such as illustrated in Example 2 above. Thus, if the Accept header contains the string "application/soap+xml," an applicable rule can be evaluated to determine the action to undertake, such as forwarding the GET request to a specified XML server (such as one of the servers 114) that has the capability to service and respond to the GET request.

Since the above-described implementation provides the capability to examine contents of the HTTP header 310, an embodiment further extends the capability to inspect content beyond HTTP headers. SOAP messages 200 form the body (i.e., the HTTP payload 312) of the HTTP message 200, and therefore, it is possible to inspect content of the SOAP message 200 that lies beyond the HTTP header fields 314. This feature thus allows the inspection of encapsulated XML content 316 and 318 in the HTTP payload 312, and allows the load balancing decisions to be made based at least in part on the XML contents of the SOAP message 200.

According to an embodiment, command line interface (CLI) statements may be use to configure rules that are based on the XML content of a packet. These rules can include nested rules or other complex rules that specify certain actions to be undertaken if certain XML content is found in the packet (e.g., "If the XML tag 'root_node' is present, then forward the packet to Server A."). The CLI statements allow new types of expressions to be created to search the XML documents, by examining tags, attributes, or specific strings in the XML documents. The sample format of some of these new expressions is listed in the table below, which is based on the XML document in Example 1 above.

| Syntax | Description | Examples |
|---|---|---|
| / | Represents the root element. | If (/ = "root_node") |
| /root_node/node1 | Select a child of the root element. This selects all the node1 elements in the root_node. | |
| /root_node/node1[1] | Select first child of the root element with the name of node1. | |
| /root_node/node1[last( )] | Select last child of the root element with the name of node1. | |
| /*/node1 | Selects all first generation node1 elements. | |
| //node1 | Selects all the node1 elements regardless of their lineage. | |
| //* | Selects all the elements | |
| //node1[@attr1="valu1"] | Selects node with attr1 value of "valu1". | |

Therefore to briefly explain the first row of the table, a CLI statement can be generated (and stored at the storage medium 112) to examine the root element of an XML document to determine if the string "root_node" is present therein. If the string is present or otherwise identified, the string can be matched to a rule that specifies the action to undertake, such as "forward" the packet to a particular server 114. As depicted in the table above, various other elements of the structured XML document may be searched. Rules may also be generated that are based on a search of tag and/or attribute names, prefixes/suffixes/patterns, or values.

The particular server 114 to forward the packet can be defined by a system administrator or other user. For instance, the "best" server 114 may be determined by a combination of health checks and load balancing policies defined by the user. As will be illustrated later below, messages belonging to different applications can be switched to appropriate server clusters, and further load balanced to individual servers within a cluster based on sophisticated load balancing methods.

According to an embodiment, a plurality of content switching (CSW) policies is provided. A CSW policy comprises a set of rules and actions associated with these rules. A CSW policy can have an example CLI syntax of:

csw-policy <policy-name>: match <rule-name><action> [<action-target>], wherein <policy-name> is the name of the particular CSW policy, <rule-name> is the rule being evaluated in the CSW policy, <action> is the action to be taken if the rule is true or matches, and <action-target> is the identification of a destination to which the action is to be applied. The table below lists possible values of <action>, the corresponding possible <action-target> definitions, a description of the action and/or target definition, and corresponding example CSW policies.

| Action | Target Definition | Description | Examples |
|---|---|---|---|
| Forward | <server-id/group-id> | Forwards the packet to the group-id specified in the action target. | match ruleA forward 1 |
| Persist | <offset> <length> <type> | Persist action type is valid for header-name rule type.<br>Offset - Offset of the content to be persisted on<br>Length - Length of the content to be persisted on<br>Type - Persistence type. This can be group-server-id, hashing or server-name.<br>group-server-id: packets are sent to the group-server-id specified at the offset.<br>server-name: packets are sent to the server-name specified at the offset.<br>Hashing: packets with the same hash content specified at the offset are sent to the same server. | match ruleD persist 10 20 group-server-id<br>* group-server-id is in the 20 bytes located at the offset 10 from the header-name specified in ruleD.<br>match ruleD persist 10 20 server-name<br>* server-name is in the 20 bytes located at the offset 10 from the header-name specified in ruleD.<br>match ruleD persist 10 20 hashing |
| Redirect | <new-domain> [<new-url>] | Redirects the packet to the specified domain-name. Optionally one can specify the new-url also. | match ruleB redirect "foo.com" |
| Reply-error | — | Sends an error page to the client | match ruleE reply-error |
| Reset-client | — | Send a reset to the client | match ruleD reset-client |

To briefly describe some of the entries in the table above, the CSW policy "match ruleA forward 1" in the first table row states that if there is a match of ruleA, then forward the packet to the servers having a group ID of 1. The CSW policy "match ruleB redirect 'foo.com'" in the third table row states that if there is a match of ruleB, then redirect the packet to the domain "foo.com." The other example CSW policies, actions, and target definitions are self-explanatory from the table above, and therefore, for the sake of brevity, will not be described in further detail.

The above table and examples provided <rule-name> examples of "ruleA," "ruleB," etc. An example CLI syntax to define any particular rule is:

Rule: rule-name rule-type <rule-data>, wherein the "rule-type" specifies the type of rule involved with that particular <rule-name>, and <rule-data> specifies the XML-related information (such as in the SOAP header 204 or body 206) or header fields of an HTTP packet (or other location of the packet) that has data to be evaluated by the rule. Example rule types are nested rule, method, URL, version, header, header-name, XML tag, and other suitable rule types.

The table below provides more details for the rule types, syntax for <rule-data>, description of the rule type, and examples according to an embodiment.

| Rule-Type | Rule-Data Syntax | Description | Examples |
|---|---|---|---|
| Method | <eq | ne> <method-string> | This type of rule is used for content switching based on the method type in the http header. The two operators supported are eq (equals) and ne (not equals) to test the equality of the method string.<br>Method strings can be one of the following:<br>OPTIONS\|GET\|HEAD\|POST\|PUT\|DELETE\|TRACE\|CONNECT | csw-rule ruleA method eq GET |
| Nested-rule | <rule-string> | Nested rules are used for defining complex rules with logical operators. The syntax for representing these rules is shown below:<br>expr    -> expr & term<br>          -> expr \| term<br>          -> term<br>term    -> !factor<br>          -> factor<br>factor    -> (expr)<br>          -> ruleId<br>In the above example:<br>ruleId - name of the simple rule. Nesting of complex rules is not allowed in one embodiment.<br>& - logical "and"<br>\| - logical "or"<br>! - logical "complement" | csw-rule ruleB "X&(Y\|Z\|(!W))"<br>W, X, Y, Z represent simple rules. |

-continued

| Rule-Type | Rule-Data Syntax | Description | Examples |
|---|---|---|---|
| url | <prefix\|suffix\|pattern> <type-value-string> | This type of rule uses the url in the http header to make content switching decision. The following three operators are supported Prefix - looks for the longest prefix specified by the type-value-string. Suffix - looks for the longest suffix specified by the type-value-string. Pattern - looks for the pattern specified by the type-value-string. | csw-rule ruleC prefix "/home" |
| Header-name | <header-name> exists | This type of rule is used for determining whether a given header name exists in the http headers. Only this type of rule can accept the persist rule action in one embodiment. | csw-rule ruleF header-name "Language" exists. |
| Header | <header-name> <equals\|prefix\|suffix\|pattern> <header-value> | This type of rule is used for switching based on the value of the http headers. For example, it is possible to switch based on the host name in the http header. | csw-rule ruleG header "host" prefix "www.yahoo" |
| xml-tag | <tag-name> <prefix\|suffix\|pattern> <tag-value> | Content switching decision is based on the xml-tag present in the packet. | csw-rule ruleH xml-tag "tag1" prefix "test" |

To briefly describe some of the entries in the table above, the first table row defines ruleA based on the method type specified in the HTTP header. Thus in the example, ruleA is defined for packets where the method in the HTTP header is equal to (or contains) a GET string. In an embodiment, ruleA may be combined with another rule to determine if the GET request is accompanied by an Accept header specifying XML-related information, such as "application/soap+xml" in Example 2 above.

The second table row specifies that nested rules are used for defining complex rules (e.g., ruleB). The complex rules are made up of simple rules (e.g., W, X, Y, Z) that strung together through logical operators. For example, one or more XML-related simple rule may be combined with one or more non-XML-related simple rules, and/or multiple XML-related simple rules may be strung together.

The third table row applies the rule to the URL specified in the HTTP header. The URL may be examined with respect to the prefix, suffix, or other pattern in the URL string.

The fourth table row defines a rule in terms of whether a given header name exists in the HTTP header. The fifth table row defines a rule based on the content of the HTTP header, which can include a header name, a string (such as prefix, suffix, or pattern), or a header value. For example, the rule might be applied to a packet having a string or host prefix of "www.yahoo."

The sixth table row involves a rule wherein content switching is based on the XML tag and/or attributes present in the packet. That is, identified tags, attributes, or other XML-related content in the SOAP body 206 may be compared with this rule to determine if a match exists.

With regards to nested rules, multiple rules can be combined to define a single rule, using parenthesis and logical operators in an embodiment. The table below explains these logical operators and their use within an expression of a nested rule:

```
csw-rule "rule-name" nested-rule expr
                 The syntax of expr is discussed below
-----------------------------------------------------------------------
left associative grammar
```

-continued

```
NOT(!) has higher precedence than AND (&) and OR (|)
-----------------------------------------------------------------------
expr                    -> expr && term
                        -> expr || term
                        -> term
term                    -> !factor
                        -> factor
factor                  -> (expr)
                        -> rule-id (rule-id is a predefined rule)
Example:
csw-rule: "n_rule" nested-rule "(!ruleA || ruleB) && (ruleC || ruleD)"
ruleA, ruleB, ruleC, ruleD can be either simple rule or multiple rules.
```

The table below provides an illustration of the manner in which simple rules may be individually defined or configured at the switches 108 with CLI command, and then combined into complex (nested) rules. An example policy (policy A) that defines content switching actions based on the results of the evaluation of the rules is also provided below.

```
csw-rule r_url_prefix_1 url prefix "/home"
csw-rule r_url_prefix_2 url prefix "/news"
csw-rule r_url_suffix_1 url suffix ".html"
csw-rule r_url_suffix_2 url suffix ".gif"
csw-rule r_url_pattern_1 url pattern "cnn"
csw-rule r_url_pattern_2 url pattern "cbs"
csw-rule r_url_host_1 header hostname EQ "cnn.com"
csw-rule r_url_host_2 header hostname EQ "cbs.com"
csw-rule r_cookie_1 header cookie-name EQ "cookie1"
csw-rule r_cookie_1 header cookie-name EQ "cookie1"
csw-nested-rule ruleA (r_url_prefix_1 AND r_cookie_2) OR r_url_pattern_1
csw-nested-rule ruleB (r_url_host_1 AND r_cookie_2) OR r_url_pattern_1
csw-nested-rule ruleC (r_url_prefix_1 AND r_suffix_2) OR r_url_pattern_1
csw-policy policyA
match rule ruleA forward 1
match rule ruleB reply-error
match rule ruleC reset-client
default 5
```

In the above example, the simple rules are defined with regards to content of the URL string (prefix, suffix, and pattern) specified in the HTTP header. Other simple rules are defined with regards to values in the hostname and cookie specified in the HTTP header. Complex nested rules A, B, and C are in turn defined using these simple rules that are expressed using logical operators and parentheses. Finally, the policy A is defined, which specifies the particular action for the switch 108 to undertake based on whether there is a match of any one of the nested rules A, B, or C. While the above example relates to non-XML-related content, a person skilled in the art having the benefit of this disclosure can easily generate a set of rules and policies that are based at least in part on the XML-related content of a packet.

Additional details and examples of rules, polices, evaluation techniques, and the like for non-XML-related content are disclosed in U.S. patent application Ser. No. 10/731,972, entitled "METHOD AND APPARATUS for LOAD BALANCING BASED ON PACKET HEADER CONTENT," filed concurrently herewith, with inventor Anilkumar Gunturu, assigned to the same assignee as the present application, and incorporated herein by reference in its entirety.

Figure 4:
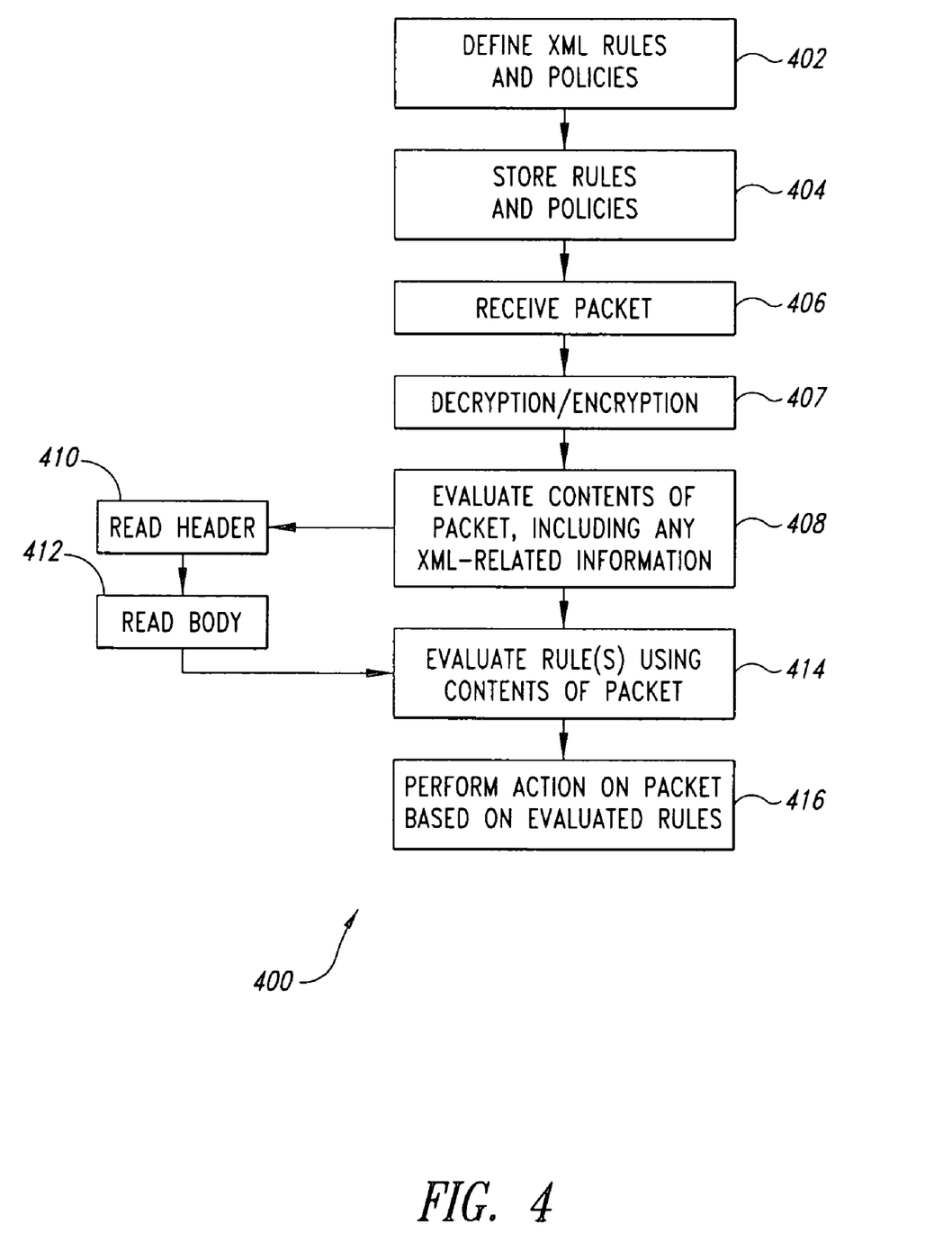
FIG. 4 is a flowchart of a technique to use rules to evaluate XML-related contents of a packet in connection with content switching according to an embodiment.

FIG. 4 is a flowchart 400 of a technique to use rules to evaluate XML-related contents of a packet in connection with content switching according to an embodiment. Elements of the flowchart 400 (and other flowcharts depicted herein) may be embodied in software, code, or other machine-readable instruction stored on a machine-readable medium. For example, operations represented by the flowchart 400 may be embodied in software stored at the storage medium 112, which can be executed by the processor 110. It is appreciated that the operations depicted in the flowcharts need not necessarily occur in the exact order shown, and that various operations may be added, removed, modified, or combined.

At a block 402, a plurality of both simple and complex XML rules is defined. These complex and simple XML rules may be defined using the techniques illustrated and described with respect to the tables shown above, such as via use of logical operators, parentheses, rule types, and so forth. The XML rules may be combined with non-XML-related rules to thereby define additional types of complex rules. For load balancing purposes, the rules and policies may be defined in a manner that packet traffic to the servers 114 can be optimally distributed. At the block 402, the CSW policies may also be defined to specify the actions to be taken given one or more rules that are satisfied.

In an embodiment, the rules and policies may be generated via CLI commands programmed into the storage medium 112 or otherwise stored at a block 404. The CLI commands for searching an XML document may also be defined and stored at the block 404. Any suitable technique may be used to store the rules and policies at the block 404, including but not limited to, storage in databases, file systems, lookup tables, or other data structure. The rules and policies may also be stored as static or dynamic code. For the sake of simplicity of explanation, the rules and policies will be described hereinafter in terms of being stored in a database format, and it is appreciated that the invention is not limited to databases.

At a block 406, a packet sent from one of the clients 102 is received at the switch 108 (or at some other network location that has the capability to perform content switching). If the packet is encrypted, then decryption (and subsequent encryption) is performed at a block 407. For example, since XML is used for many web-based transactions that need to be secure, the contents of a packet is typically encrypted. A secure sockets layer (SSL) accelerator or other suitable device may be used at the block 407 to decrypt incoming packets, to enable their contents to be read, and then to re-encrypt the packets before forwarding to the next destination.

When the packet contents are decrypted, the switch 108 needs to evaluate the contents of the packet and determine which server 114 to route the packet (or to perform some other action). The received packet may or may not necessarily contain XML-related information. For example at a block 408, the switch 108 can evaluate the contents of the packet, including searching for and reading any XML-related information and/or by reading the data in its HTTP header fields. Various techniques may be used to read such data. In one embodiment, all fields can be read in sequence. In another embodiment, only certain fields are read and may further be read in some specific order. In the context of HTTP header fields, URL strings, cookie, hostname, method, and the like may be scanned.

In the context of XML-related information, a header of the packet is read or otherwise identified at a block 410. For example, the GET request in the HTTP header may be scanned to determine if the Accept header contains any XML-related information. Alternatively or additionally, the SOAP header 204 may be scanned to determine whether any XML-formatted content is present.

The body of the packet may also be read or otherwise identified at a block 412. In this block 412, the HTTP payload 312, the SOAP body 206, or other portion of a response or request may be scanned for XML tags and attributes, or for related XML strings. Examples of such XML-related information and the manner in which they are processed according to rules for load balancing or servicing purposes are provided later below. The scanning may be performed in one embodiment by using CLI statements that specify the string to search in a root element and/or in other nodes within the XML structure.

Using the identified XML contents and/or contents of the HTTP header (or other portions of the received packet), the applicable rules are evaluated at a block 414. For example, if the HTTP header includes a GET method string and an Accept header that specifies "application/soap+xml," then a particular complex rule is evaluated using results of simple rules that are defined using contents of method and URL fields in an HTTP header. In one embodiment, the complex rule may be evaluated in sequence, such as by sequentially evaluating each simple rule one after another. In another embodiment, rules may be stored in a data structure, and the contents of the packet are scanned once to determine the matching action. Finite automaton or trie structures may be used in this embodiment.

In yet another embodiment, the complex rule may be reduced to sums of products of simple rules or "minterm" representations, and then bit masks can be generated for each simple rule. By reducing the complex rules into minterms, simpler logical operations can be used for evaluation. An AND operation is performed for all of the bit masks of simple rules that correspond to content of the packet, and a new bit mask is generated as a result. The first non-zero bit of the new bit mask corresponds to a minterm and action to be performed on the packet. Further details of this minterm and bit mask technique to evaluate complex rules is disclosed in the co-pending application entitled, "METHOD AND APPARATUS for LOAD BALANCING BASED ON PACKET HEADER CONTENT," previously identified above.

At a block 416, one or more actions are performed on the packet based on the evaluated rules, in accordance with the applicable CSW policy. For example, the packet may be forwarded to a particular server or redirected. Other actions include persist, error message, reset, and the like.

FIGS. 5-8 provide examples of content switching based on XML content in accordance with various embodiments. At least some of the network elements depicted in FIGS. 5-8 may comprise part of the system 100 of FIG. 1.

Figure 5:
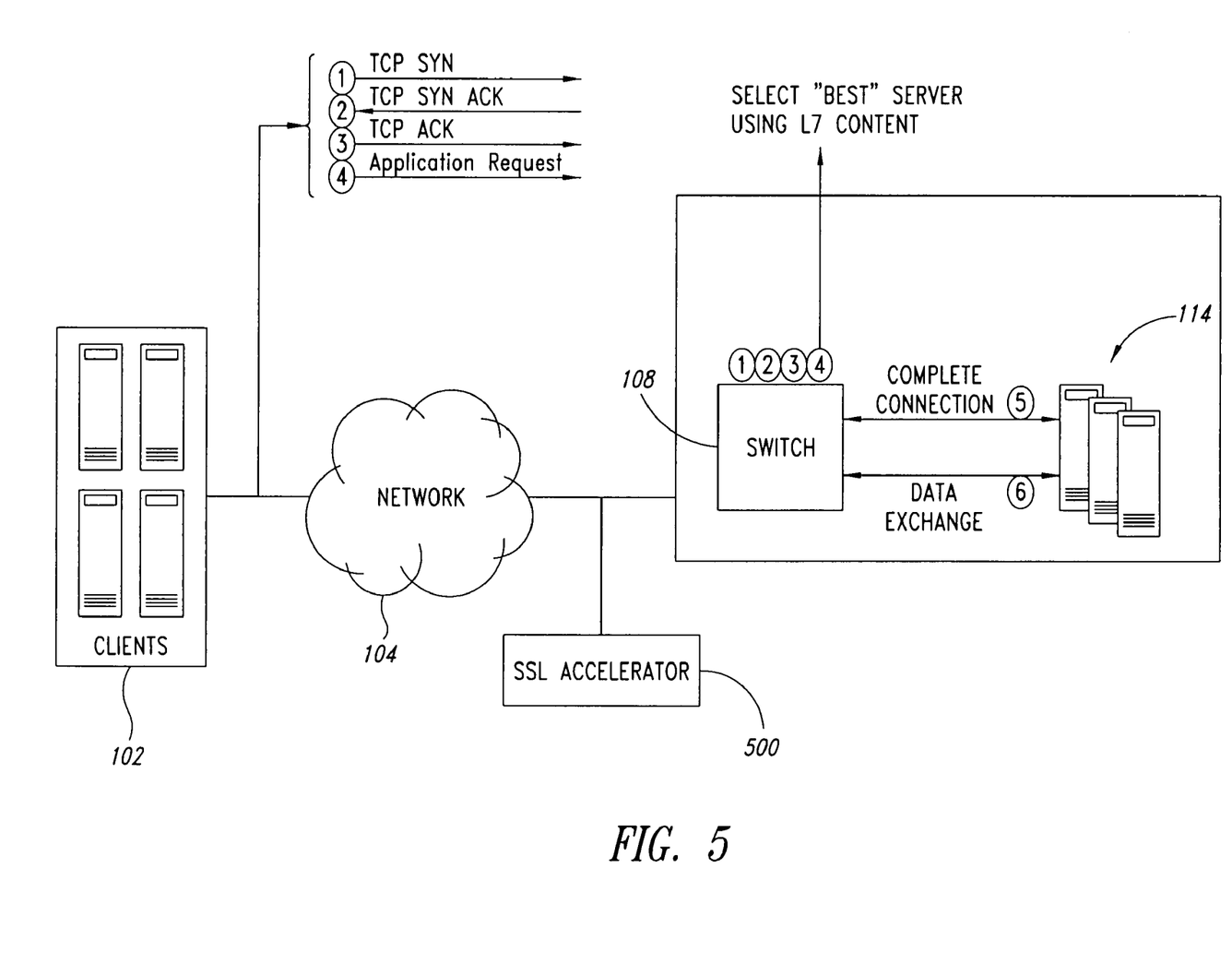
FIGS. 5-8 provide examples of content switching based on XML content in accordance with various embodiments.

In FIG. 5, load balancing using Layer 7 content, including XML content, dictates that the switch 108 (or other load balancer) delay the selection of the "best" server 114 (binding of client connections to a specific server) until after the application messages are sent by the client terminal 102. The switch 108, acting as a proxy, completes the connection with the client terminal 102, and awaits the first application message to arrive. XML-based applications will send XML messages as part of the application request. After inspecting the content of the message and matching with the user-configured content switching rules, the switch 108 picks the "best" one of the servers 114 (or to a server pool) for the client transactions. Up to this time, packets are buffered until information for load balancing is received. After selecting the server, the load balancer completes the connection to the server and binds the client-side connection to the new server-side connection. An SSL accelerator 500 or other suitable decryption/encryption device may be used in FIG. 5 (and also in FIGS. 1 and 6-8) to allow the content of the message to be inspected and interpreted by the switch 108.

In an embodiment, session persistence is present for many applications where each session (e.g., group of transactions) spans multiple Layer 4 connections. Client requests belonging to a given session are load balanced to the same server. The switch 108 can feature many session-persistence mechanisms like cookie, SSL session ID, and source IP. When XML switching is enabled, session persistence is also achieved using XML tag and attribute values.

Figure 6:
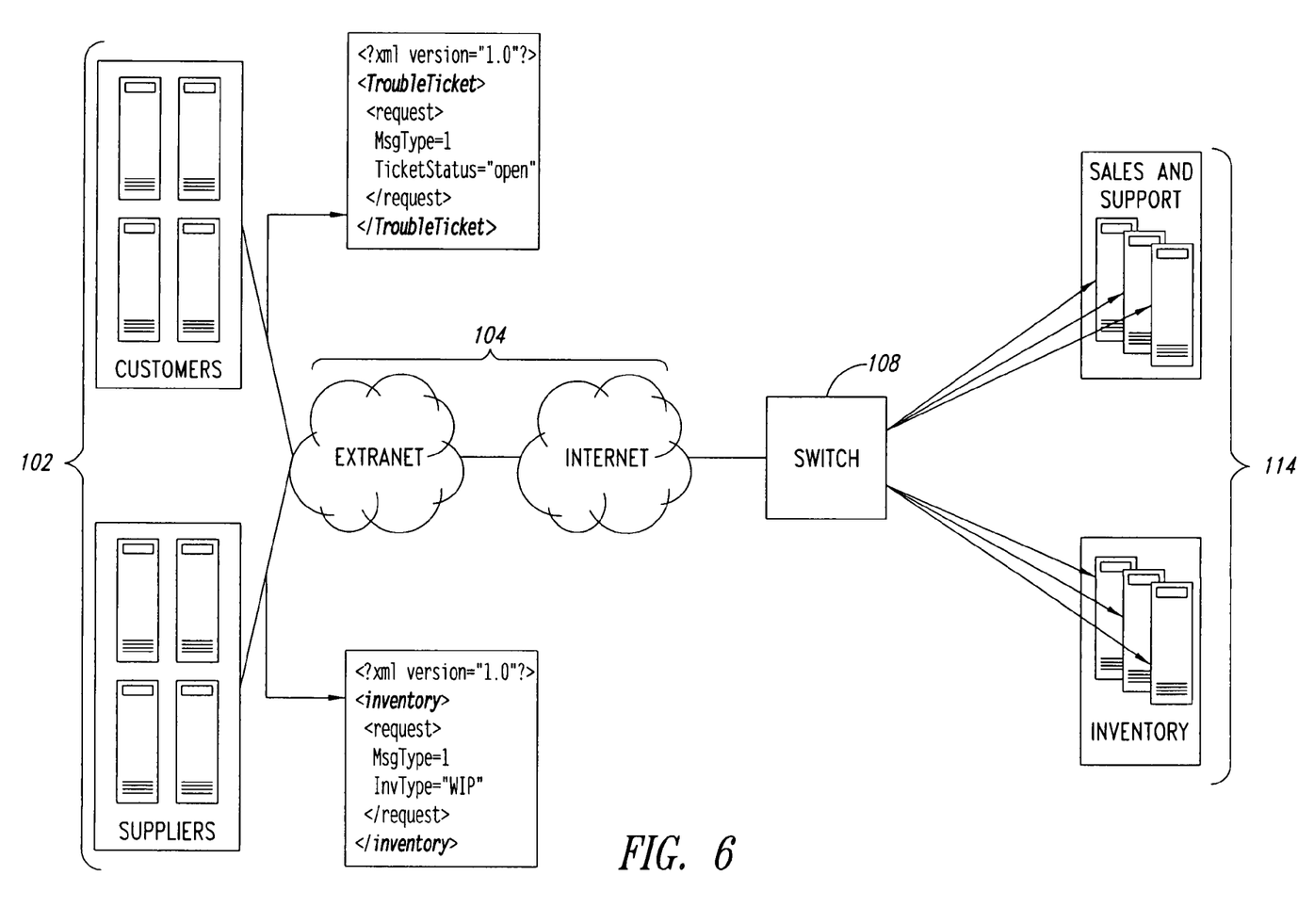

In FIG. 6, enterprises are increasingly using XML to exchange information over extranets with suppliers, customers, partners, etc. These real-time information exchanges are drivers of business productivity and profitability. Availability and performance are advantageous to ensure timely and uninterrupted access to applications and information to support ongoing business operations. Using the XML intelligence described herein, Layer 4-7 load balancers help enterprises build highly reliable and massively scalable extranet application infrastructure that delivers the highest availability and performance to application users.

Therefore, FIG. 6 shows the use of XML switching to load balance multiple applications. Suppliers and customers (shown at 102) access different applications and engage in various types of transactions. The switch 108 inspects application packets to determine the application type and select the appropriate server cluster to direct client requests. After selecting the cluster, the switch 108 can further inspect the content or other user-defined load balancing methods to select the "best" server within a given cluster of servers 114 to process the client request. Thus, using XML switching allows differentiating applications and transactions to be flexible and customizable for specific network.

Figure 7:
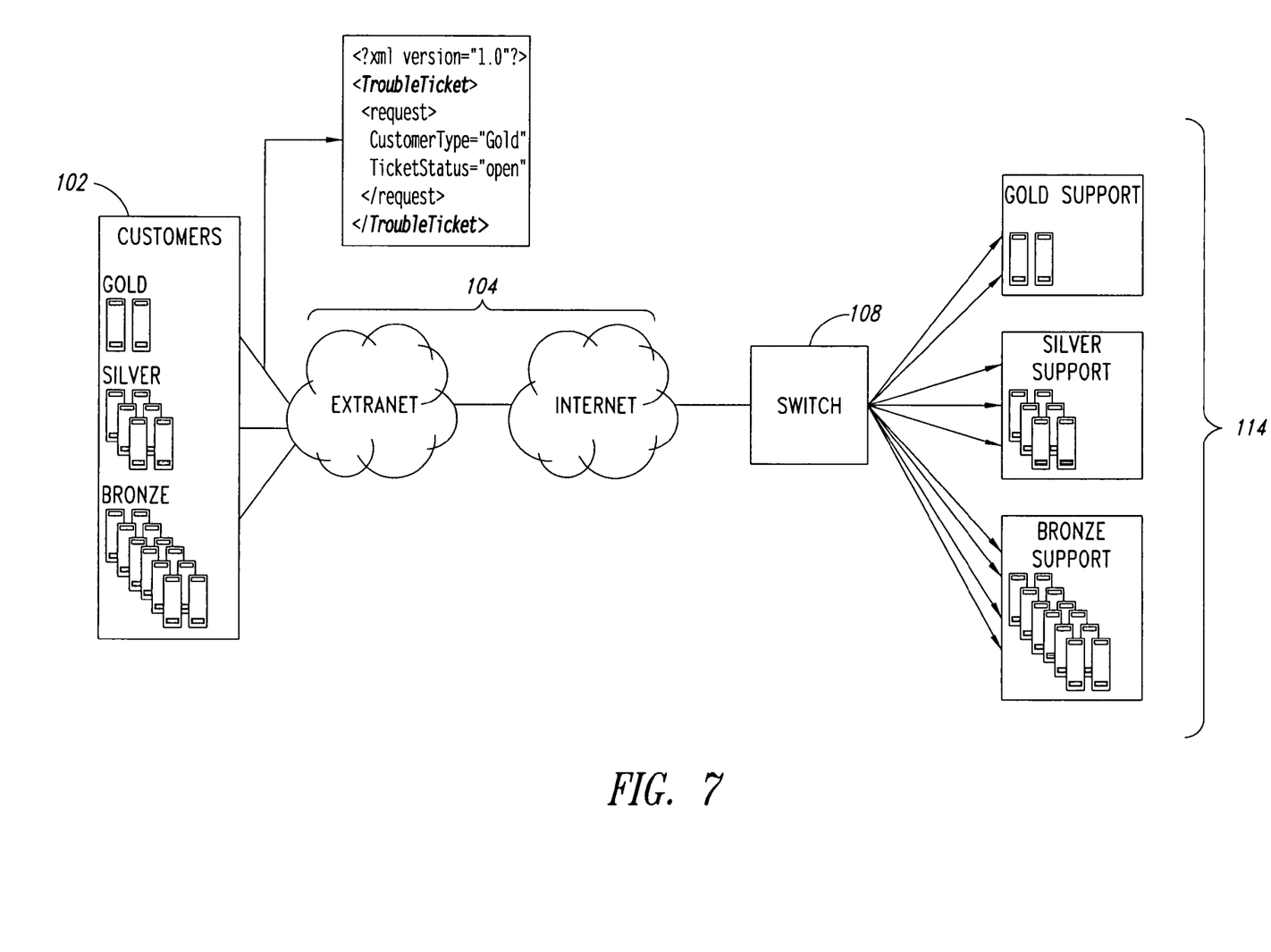

In FIG. 7, most applications serve a large number of clients' needs, but not all clients need to be treated in exactly the same manner. Businesses routinely segment their customers (or partners) into different classes and offer differentiated service to each class. In many cases the classification may follow the natural business model. For example, a company may sell tiered support contracts to its customers and categorize them as gold, silver and bronze. Gold customers are highly valued and are offered the highest level of service and the least response time.

With XML switching, network and application infrastructure can be designed to offer differentiated service to segments of clients. The switch 108 inspects XML messages to identify the class of client and then direct the requests to the servers 114 dedicated to serve a given client class. FIG. 7 shows an example customer support application with differentiated service. The switch 108 uses its XML awareness to identify the type of client and directs requests to the cluster of dedicated servers 114. Load balancing to the individual servers within the cluster is performed using a variety of user-specified methods that can be based on CSW rules and policies.

The example of FIG. 7 showed client classification and prioritization. Even within a class of clients, not all transactions are equal. Some transactions may be very time sensitive, and have significantly higher performance and response time needs. Some other transactions may be more critical for the business operations. The switch 108 of one embodiment is capable of differentiating and prioritizing application transactions to deliver the highest performance overall.

Figure 8:
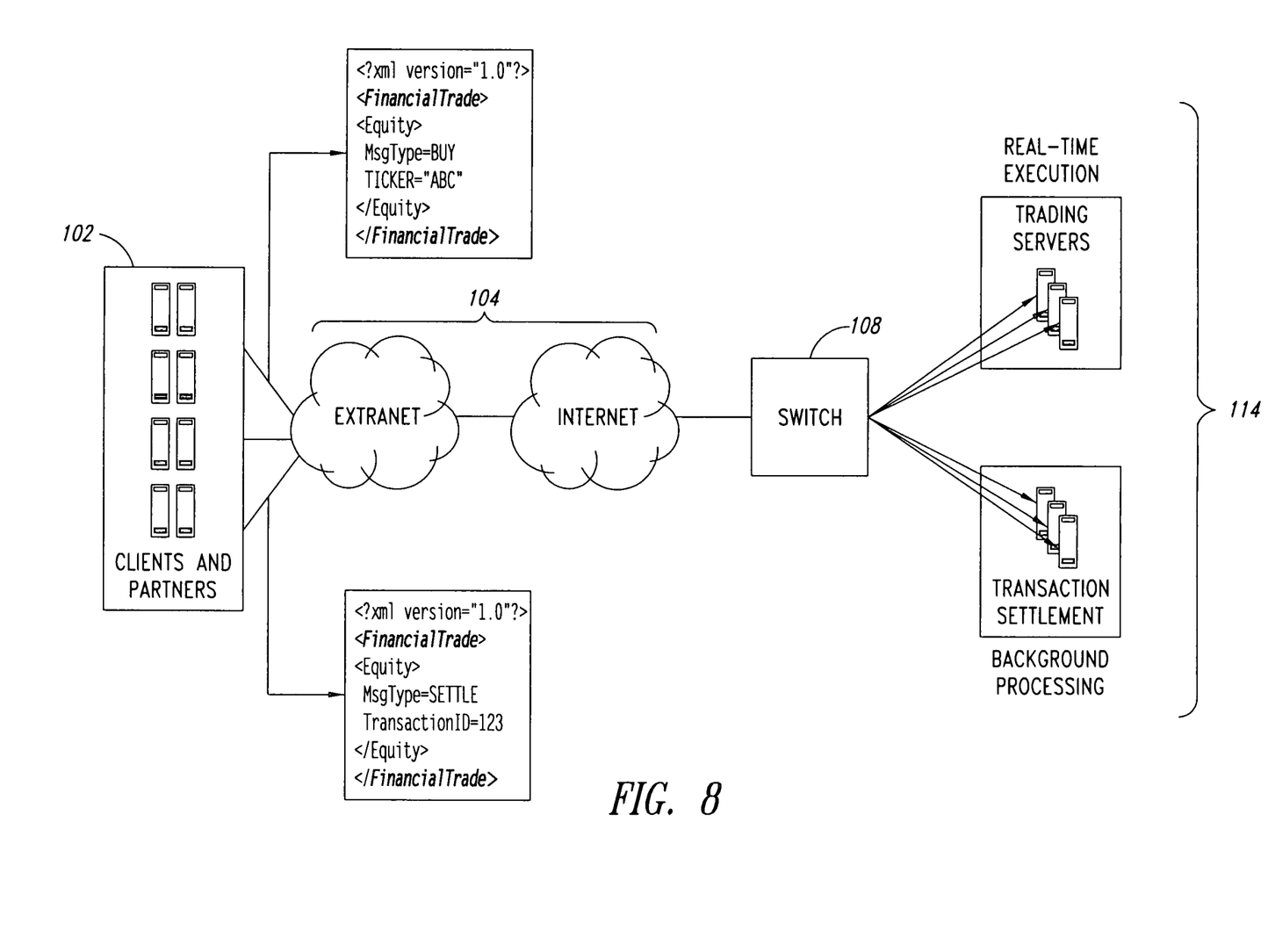

For example in FIG. 8, financial transactions involving trade executions are extremely time sensitive and need non-stop uptime, whereas the ones involving transaction settlement are less time critical. Using XML switching, the switch 108 can distinguish between transaction types, prioritize requests, and optimize performance. Additionally, the switch 108 can switch the high priority transactions to a different cluster of servers 114 that are capable of delivering higher performance.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

For example, embodiments have been described herein in terms of making load balancing decisions on the basis of XML-related content that is encapsulated by SOAP. It is appreciated that other embodiments can be applied to implementations where XML (or other structured document format) is used with protocols different from SOAP and carried using a transport protocol different from HTTP and TCP/IP.

Moreover, several example formats and syntax for XML documents structures, rules, policies, software commands, and the like have been provided herein. It is appreciated that these examples are merely for purposes of explanation and illustration. Other embodiments can use different structures, formats, and syntax These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
examining a packet to determine if the packet contains extensible markup language (XML)-related content;
if XML-related content is determined to be contained in said packet, matching the XML-related content to a rule;
examining the packet to identify non-XML-related content;

if non-XML-related content is determined to be contained in said packet, matching the non-XML-related content to a rule; and determining a particular routing action to undertake based on the rules corresponding to the XML-related content and to the non-XML-related content.

2. The method of claim 1, further comprising decrypting the packet prior to examining the packet.

3. The method of claim 1 wherein said examining the packet includes examining XML root and node elements of the packet to identify content that can be matched to specific ones of said rules.

4. The method of claim 1 wherein said particular routing action includes at least one of performing a delayed binding operation and buffering packets until information for load balancing is received, load balancing multiple XML applications, differentiating service of packets based on their XML-related content, and prioritizing transactions based on XML-related content of packets.

5. An apparatus, comprising:

a processor;

a first element under control of the processor to examine a packet to determine if the packet contains extensible markup language (XML)-related content;

a second element under control by the processor to match the XML-related content determined to be contained in said packet to at least one rule associated with the XML-related content;

a data structure accessible by the processor to store said at least one rule associated with the XML-related content;

a third element under control by the processor determine a particular routing action to perform on the packet;

wherein the data structure further stores rules that are associated with non-XML-related content, the first element being capable to examine the packet for the non-XML-related content, the second element being capable to match the non-XML-related content of the packet to at least one said rule associated with the non-XML-related content, the third element being capable to determine the particular routing action based on said rules associated with the XML-related content and associated with the non-XML-related content that are present in the packet.

6. The apparatus of claim 5, further comprising a decryption device to decrypt said XML-related content contained in the packet.

* * * * *